United States Patent
Gouget et al.

(10) Patent No.: US 12,481,969 B2
(45) Date of Patent: Nov. 25, 2025

(54) METHOD FOR SECURE, TRACEABLE AND PRIVACY-PRESERVING DIGITAL CURRENCY TRANSFER WITH ANONYMITY REVOCATION ON A DISTRIBUTED LEDGER

(71) Applicant: THALES DIS FRANCE SAS, Meudon (FR)

(72) Inventors: Aline Gouget, Issy les Moulineaux (FR); Amira Barki, Paris (FR); Lorenzo Gaston Guirao, Montigny-le-Bretonneux (FR)

(73) Assignee: THALES DIS FRANCE SAS, Meudon (FR)

( * ) Notice: Subject to any disclaimer, the term of this patent is extended or adjusted under 35 U.S.C. 154(b) by 90 days.

(21) Appl. No.: 18/024,586

(22) PCT Filed: Jul. 27, 2021

(86) PCT No.: PCT/EP2021/070924
§ 371 (c)(1),
(2) Date: Mar. 3, 2023

(87) PCT Pub. No.: WO2022/048826
PCT Pub. Date: Mar. 10, 2022

(65) Prior Publication Data
US 2024/0013170 A1    Jan. 11, 2024

(30) Foreign Application Priority Data
Sep. 4, 2020 (EP) ..................... 20315403

(51) Int. Cl.
*G06Q 20/10* (2012.01)
*G06Q 20/36* (2012.01)
(Continued)

(52) U.S. Cl.
CPC .......... *G06Q 20/10* (2013.01); *G06Q 20/367* (2013.01); *G06Q 20/38215* (2013.01);
(Continued)

(58) Field of Classification Search
None
See application file for complete search history.

(56) References Cited

U.S. PATENT DOCUMENTS 10,423,961 B1 * 9/2019 El Defrawy .......... G06Q 20/065
10,438,290 B1 * 10/2019 Winklevoss ........ G06F 16/1815
(Continued)

FOREIGN PATENT DOCUMENTS

WO    WO-2020247694 A1 * 12/2020 ......... G06Q 20/0655
WO    WO-2021229275 A1 * 11/2021 ............ G06Q 20/10
WO    WO-2023239946 A1 * 12/2023 ............ G06F 21/62

OTHER PUBLICATIONS

Gyeongjin Ra et al. "An Anonymous Protocol with User Identification and Linking Capabilities for User Privacy in a Permissioned Blockchain." (Jul. 22, 2020). Retrieved online Oct. 27, 2024. https://www.mdpi.com/2079-9292/9/8/1183 (Year: 2020).*
(Continued)

*Primary Examiner* — James A Reagan

(57) ABSTRACT

The present disclosure relates to a method for secure, traceable and privacy-preserving with anonymity revocation digital currency transfer to at least a first user from a second user among a plurality of banked and unbanked users by using a distributed ledger comprising a plurality of ledger nodes, wherein said users perform Digital Currency transfers by adding transactions on this ledger using user devices configured to be connected to said nodes, to a registration authority and to a revocation authority, said authorities owning each one a public/private key pair, comprising:

(Continued)

an enrollment phase, performed by a user device of said first user, comprising:
sending to the registration authority evidence of the first user's identity,
generating a first user identification key pair comprising a first user identification public key and a first user identification secret key,
sending to the registration authority said generated first user identification public key,
receiving from the registration authority a signed token generated by the registration authority after the registration authority verified first user's identity based on said evidence, said signed token being generated by signing with the registration authority secret key a token comprising said first user identification public key and said first user's identity encrypted with said revocation authority public key,
a transaction phase, performed by said user device of said first user, comprising: participating with said second users in a Digital Currency transfer transaction to be added to the distributed ledger,
wherein said signed token enables the revocation authority to revoke first user's anonymity by retrieving first user's identity.

6 Claims, 5 Drawing Sheets

(51) Int. Cl.
*G06Q 20/38* (2012.01)
*G06Q 20/40* (2012.01)
*H04L 9/32* (2006.01)

(52) U.S. Cl.
CPC ..... *G06Q 20/3825* (2013.01); *G06Q 20/3829* (2013.01); *G06Q 20/4014* (2013.01); *H04L 9/3213* (2013.01); *H04L 9/3218* (2013.01); *H04L 9/3268* (2013.01); *G06Q 2220/00* (2013.01)

(56) References Cited

U.S. PATENT DOCUMENTS

| | | | | |
|---|---|---|---|---|
| 11,159,313 | B2* | 10/2021 | Fletcher | H04W 12/06 |
| 11,277,390 | B2* | 3/2022 | Verzun | G06F 21/64 |
| 11,728,969 | B2* | 8/2023 | Bartolucci | H04L 9/0637 |
| | | | | 713/168 |
| 11,836,717 | B2* | 12/2023 | Madisetti | G06Q 20/065 |
| 11,880,228 | B2* | 1/2024 | Magerkurth | H04L 9/0825 |
| 11,886,420 | B2* | 1/2024 | Sewell | H04L 9/0852 |
| 2016/0300234 | A1* | 10/2016 | Moss-Pultz | H04L 9/3247 |
| 2017/0011460 | A1* | 1/2017 | Molinari | H04L 9/3247 |
| 2017/0161829 | A1* | 6/2017 | Mazier | G06Q 40/06 |
| 2018/0374091 | A1* | 12/2018 | Madisetti | G06Q 20/3825 |
| 2019/0012662 | A1* | 1/2019 | Krellenstein | G06Q 20/3827 |
| 2019/0139136 | A1* | 5/2019 | Molinari | H04L 63/0823 |
| 2019/0303886 | A1* | 10/2019 | Kikinis | H04L 9/0637 |
| 2019/0386969 | A1* | 12/2019 | Verzun | G06F 21/606 |
| 2020/0005290 | A1* | 1/2020 | Madisetti | G06Q 20/065 |
| 2020/0058023 | A1* | 2/2020 | Travizano | H04L 9/3239 |
| 2020/0112442 | A1* | 4/2020 | Wentz | H04L 9/3297 |
| 2022/0114578 | A1* | 4/2022 | Jentzsch | H04L 9/3247 |
| 2022/0182368 | A1* | 6/2022 | Madisetti | H04L 9/14 |
| 2023/0104934 | A1* | 4/2023 | Madisetti | G06Q 20/3829 |
| | | | | 705/71 |
| 2023/0298015 | A1* | 9/2023 | Kiraz | H04L 9/0861 |
| 2024/0265355 | A1* | 8/2024 | McCabe | G06Q 20/3829 |

OTHER PUBLICATIONS

Rui Zhang et al. "Security and Privacy on Blockchain." (Jul. 2019). Retrieved online Oct. 27, 2024. https://dl.acm.org/doi/fullHtml/10.1145/3316481 (Year: 2019).*

Dmytro Bogatov et al. "Anonymous Transactions with Revocation and Auditing in Hyperledger Fabric ." (2019). Retrieved online Oct. 27, 2024. https://eprint.iacr.org/2019/1097.pdf (Year: 2019).*

International Search Report (PCT/ISA/210) and Written Opinion (PCT/ISA/237) mailed on Oct. 11, 2021, by the European Patent Office as the International Searching Authority for current International Application No. PCT/EP2021/070924—[10 pages].

Wust Karl et al: "PRCash: Fast, Private and Regulated Transactions for Digital Currencies " Sep. 30, 2019 (Sep. 30, 2019), Lecture Notes in Computer Science; [Lecture Notes in Computer Science; Lect.Notes Computer], Springer Berlin Heidelberg, Berlin Germany, pp. 158-178, XP047521619, ISSN: 0302-9743—ISBN: 978-3-030-67069-6—[retrieved on Sep. 30, 2019]—sections 2, 3 • figure 1.

Wang Zhaoyang et al: "DAPS: A Decentralized Anonymous Payment Scheme with Supervision", Jan. 22, 2020 (Jan. 22, 2020), Lecture Notes in Computer Science; [Lecture Notes in Computer Science; Lect.Notes Computer], Springer Berlin Heidelberg, Berlin Germany, pp. 537-550, XP047534290, ISSN: 0302-9743—ISBN: 978-3-030-67069-6—[retrieved on Jan. 22, 2020]—sections 3, 4; figures 1, 3, 4.

* cited by examiner

METHOD FOR SECURE, TRACEABLE AND PRIVACY-PRESERVING DIGITAL CURRENCY TRANSFER WITH ANONYMITY REVOCATION ON A DISTRIBUTED LEDGER

FIELD OF USE

The present invention relates to the field of digital currency payment, and more particularly to a method for a secure digital currency transfer allowing both the anonymity of its users and to revoke this anonymity under special circumstances.

BACKGROUND

Over the past decade, there has been a growing interest in systems allowing to perform payments both online and/or in a physical store using a digital currency. A first category of solutions that have been proposed are centralized solutions in which digital currency transfers are managed by a central authority. Such solutions efficiently enable users to pay for goods and services, and also to transfer digital currency units from one individual to another, for example to family members, friends, or sellers that are not professional sellers.

Nevertheless, such solutions require all the users to register to a central authority, create an account and to submit all transactions through this authority. Therefore, this central authority has a full knowledge of the identity of all the users and of all the transactions.

Therefore more decentralized solutions have been proposed, mostly relying on distributed ledgers, which do not rely anymore on a central authority to manage users and transactions, and enable a direct transfer of digital currency from one user to another one, including unbanked users. The most famous example is the bitcoin digital currency, which is not controlled by any central bank or authority. Such solutions do not require users to register to an authority and therefore allow the users to remain anonymous.

Nevertheless, such a strong anonymity may also be a drawback since it enables money from fraud or criminal activities to be transferred easily without enabling law enforcement services to recover the identity of payers or payees.

Therefore there is a need for a secure digital currency transfer method and system offering to both banked and unbanked users the same properties as paper notes and physical coins money, such as anonymity and the ability to divide the currency and transfer it between users, while enabling to revoke the anonymity of users participating in a transaction when predefined conditions are met, for example in case of suspicion of fraud or money laundering.

SUMMARY

For this purpose and according to a first aspect, this invention therefore relates to a method for secure, traceable and privacy-preserving with anonymity revocation digital currency transfer to at least a first user from a second user among a plurality of banked and unbanked users by using a distributed ledger comprising a plurality of ledger nodes, wherein said users perform Digital Currency (DC) transfers by adding transactions on this ledger using user devices configured to be connected to said nodes, to a registration authority and to a revocation authority, said authorities owning each one a public/private key pair, comprising:

an enrollment phase, performed by a user device of said first user, comprising:

sending to the registration authority evidence of the first user's identity, generating a first user identification key pair comprising a first user identification public key and a first user identification secret key, sending to the registration authority said generated first user identification public key, receiving from the registration authority a signed token generated by the registration authority after the registration authority verified first user's identity based on said evidence, said signed token being generated by signing with the registration authority secret key a token comprising said first user identification public key and said first user's identity encrypted with said revocation authority public key, a transaction phase, performed by said user device of said first user, comprising:

participating with said second users in a Digital Currency transfer transaction to be added to the distributed ledger, wherein said signed token enables the revocation authority to revoke first user's anonymity by retrieving first user's identity.

Such a method enable both banked and unbanked users to securely perform Digital Currency transactions anonymously while keeping the possibility to make the revocation authority reveal the real identity of the users participating in any transaction.

According to a first embodiment:

said first user sends to a Certification Authority said signed token and receives from said certification authority a certificate on said first user identification public key comprising said first user's identity encrypted with said revocation authority public key;

said first user sends to the second user his first user identification public key which is then included in said Digital Currency transfer transaction;

to revoke first user's anonymity, the Revocation Authority gets the certificate associated to the first user identification public key and retrieves the first user's identity.

According to the first embodiment, optionally:

the second user having performed the steps of the enrollment phase of the method according to the first aspect to receive a second user signed token, having sent to a Certification Authority said second user signed token to receive a certificate on a second user identification public key and having participated in a previous transaction stored in the distributed ledger by which the second user is considered as the current owner of an amount of Digital Currency, said previous transaction comprising the second user identification public key, and the Digital Currency transfer transaction between said first user and second user comprising a reference to said previous transaction, to revoke second user's anonymity, the second user identification public key may be retrieved from said previous transaction, and the Revocation Authority may get the certificate associated to the second user identification public key and may retrieve the second user's identity.

By doing so, not only the identity of the payee (first user) but also the identity of the payer (second user) of a transaction may be revealed by the revocation authority.

According to a second embodiment wherein:
said first user identification key pair is equal to $(u_1, g\hat{}u_1)$, with $u_1$ the first user identification secret key and g a generator of a cyclic group G of order q, q being an integer,
the Revocation Authority has access to at least one list of authorized users comprising identification public keys of users, which is accessible to the Revocation Authority and enrolled users, and a private users identification list only accessible to the Revocation Authority and comprising for each user its signed token, its identification public key and the user's identity,
the Digital Currency transfer transaction between said first user and second user comprises a first user ElGamal ciphertext generated by encrypting the first user identification public key with said revocation authority public key,
said first user sends to the Revocation Authority its signed token,
said Revocation Authority records the first user identification public key in the authorized user list, and the signed token, the first user identification public key and the first user's identity in the private users identification list,
the first user provides the second user with a zero-knowledge proof of knowledge which proves that the first user ElGamal ciphertext is the ElGamal ciphertext value of a user identification public key that belongs to the list of authorized users and that the first user knows the corresponding user identification private key, without revealing the first user identification public key,
the second user verifies the zero-knowledge proof of knowledge provided by the first user and appends it in the Digital Currency transfer transaction which is added to the distributed ledger,
to revoke first user's anonymity, the Revocation Authority gets the first user ElGamal ciphertext and retrieves the first user's identity using its private users identification list.

According to the second embodiment, optionally:
the second user having performed the steps of the enrollment phase of claim 1 to receive a second user signed token, having sent to the Revocation Authority said second user signed token and having participated in a previous transaction stored in the distributed ledger by which the second user is considered as the current owner of an amount of Digital Currency, and
the DC transfer transaction between said first user and second user comprising a reference to said previous transaction and said previous transaction comprising a second user ElGamal ciphertext generated by encrypting the second user identification public key with said revocation authority public key and a zero-knowledge proof of knowledge which proves that the second user ElGamal ciphertext is the ElGamal ciphertext value of a user identification public key that belongs to the list of authorized users and that the second user knows the corresponding user identification private key, without revealing the second user identification public key,
to revoke second user's anonymity, the second user ElGamal ciphertext generated by encrypting the second user identification public key with said revocation authority public key is retrieved from said previous transaction, and obtained by the Revocation Authority, which retrieves the second user's identity.

By doing so, the payee (first user) is authenticated as a registered user and the anonymity of the payee is increased since his public identification key is not revealed to the payer (second user), but the revocation authority keeps the ability to retrieve the real identity of any user, both payer and payee.

The Revocation Authority may provide a zero-knowledge proof of knowledge to prove that it correctly retrieved the first user's identity.

In the first embodiment, the Revocation Authority may provide a zero-knowledge proof of knowledge which proves that the Revocation Authority has correctly decrypted the ciphertext of said first user's identity encrypted with said revocation authority public key comprised in the certificate.

In the second embodiment, the Revocation Authority may provide a zero-knowledge proof of knowledge which proves that the Revocation Authority has correctly decrypted both the ElGamal ciphertext comprised in the Digital Currency transfer transaction and the ciphertext of said first user's identity encrypted with said revocation authority public key comprised in the signed token.

The first user may performs again the steps of the enrollment phase of the invention according to the first aspect after he participated in a predetermined number of DC transfer transactions.

This limits the risk of malicious transaction that could be performed by an attacker which would have stolen the keys and token of a legitimate user.

In the second embodiment, the Revocation Authority may have access to several lists of authorized users.

According to a second aspect, this invention therefore relates also to a computer program product directly loadable into the memory of at least one computer, comprising software code instructions for performing the steps of the method according to the first aspect when said product is run on the computer.

According to a third aspect, the invention is also related to a system of secure, traceable and privacy-preserving digital currency transfer with anonymity revocation between at least a first and a second user among a plurality of banked and unbanked users by using a distributed ledger comprising a plurality of ledger nodes, comprising: a registration authority, a revocation authority, and user devices configured to be connected to said nodes, to said registration authority, to said revocation authority, comprising each one a processor and an interface configured to perform the steps of the method according to the first aspect.

According to a fourth aspect, the invention is also related to a system of secure, traceable and privacy-preserving digital currency transfer with anonymity revocation between at least a first and a second user among a plurality of banked and unbanked users by using a distributed ledger comprising a plurality of ledger nodes, comprising: a registration authority, a revocation authority, a certification authority and user devices configured to be connected to said nodes, to said registration authority, to said revocation authority and to said certification authority, comprising each one a processor and an interface configured to perform the steps of the method according to the first embodiment.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

The invention relates to a method enabling both banked and unbanked users to securely perform digital currency (DC) transfers in a way which preserve their privacy. In the same time, in order to prevent using the invention for fraud or crimes such as money laundering, the invention allows to trace the performed transactions and ultimately it gives a central authority the power to revoke the anonymity of any user and to expose his real identity.

Figure 1:
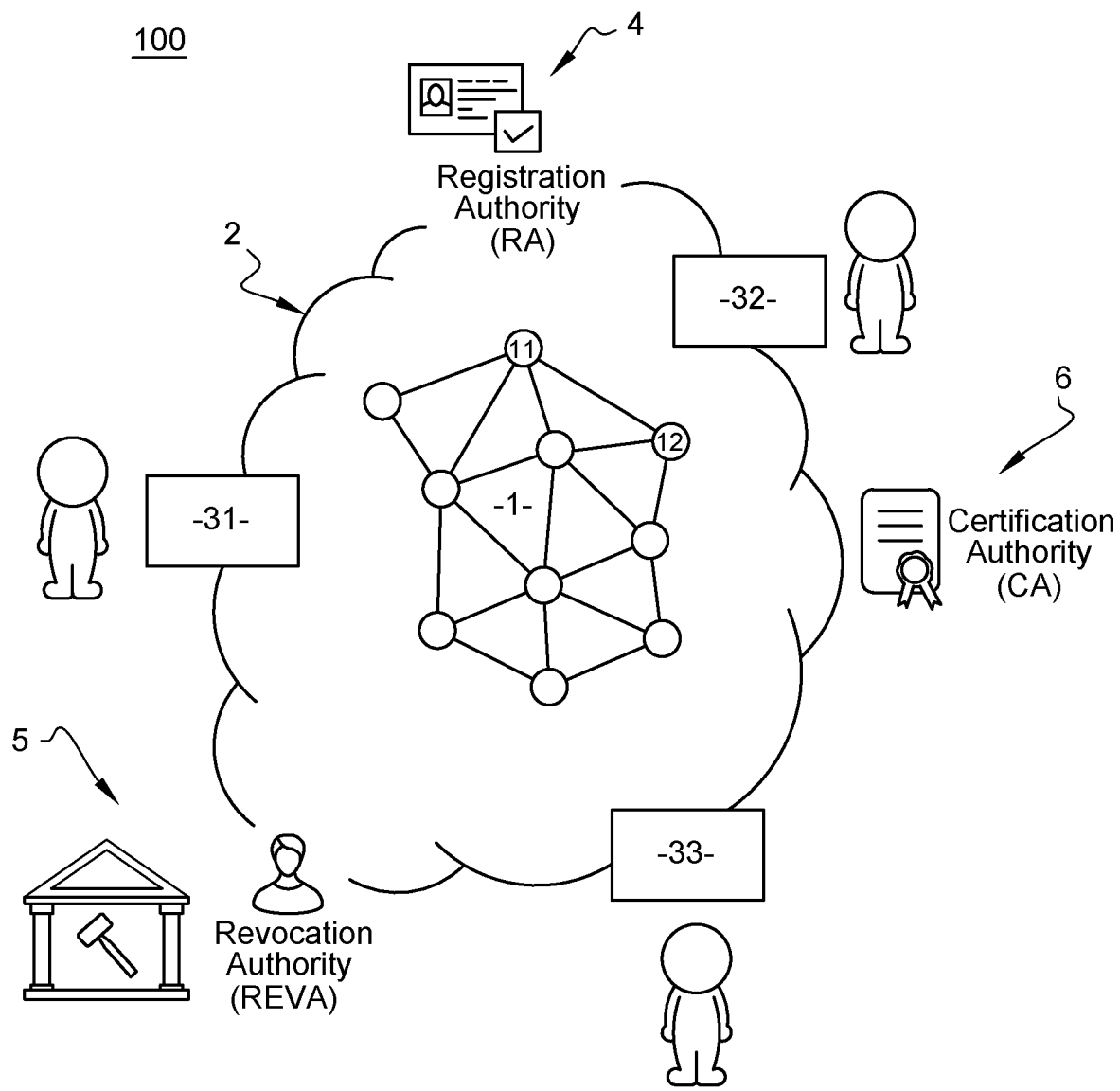
FIG. 1 is a schematic illustration of a system according to an embodiment of the present invention.

In order to enable both banked and unbanked users to participate in such transactions, the method according to the invention does not rely on a central authority such as a bank for the processing of the transactions. As shown on the system 100 on FIG. 1, in order to enable a decentralized processing of the transactions, it rather relies on a distributed ledger 1 for memorizing the transactions.

As in well-known distributed ledgers such as Bitcoin, Ethereum, Algorand such a ledger 1 comprises ledger nodes 11, 12 etc interconnected by a network 2. Users of the ledger own user devices 31, 32 . . . connected to the ledger nodes through the network 2. Users classically perform DC transfer by using their user device to submit transactions to ledger nodes, and each transaction is added to the ledger after it is validated by a ledger node.

Such user devices may for example be smart cards, mobile phones, tablet PCs, desktop or laptop computers. In the following paragraphs, descriptions of various user actions are made, such as transmitting a message to another user. Such actions are implicitly performed by the user by using his user device which exchanges data with ledger nodes and other user devices through the network 2, even if it is not explicitly described.

Figure 2:
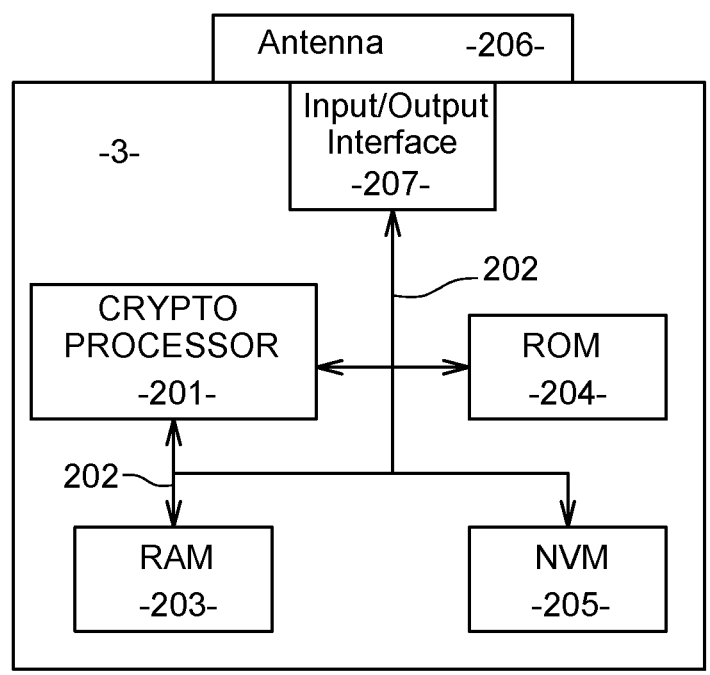
FIG. 2 is a schematic illustration of a user device according to an embodiment of the present invention.

FIG. 2 is a schematic illustration of such a user device. It may include computation means such as a CPU or a cryptoprocessor 201 connected via a bus 202 to a random access memory (RAM) 203, a read-only memory (ROM) 204, and/or a non-volatile memory (NVM) 205. The user device may further include a network interface 206 used to connect the entity to various forms of wireless networks, e.g., wide-area networks, WiFi networks, or mobile telephony networks. Alternatively, the user device may connect to networks via wired network connections such as Ethernet. The user device may also include an input/output interface 207 providing interfaces to the user of the device, such as one or more screens, loudspeakers, a mouse, tactile surfaces, a keyboard etc. . . . .

The main idea of the invention is to provide, in addition to using a decentralized distributed ledger which guaranties user anonymity, a mechanism allowing a central authority to revoke the anonymity of any user of any transaction, at any time after the transaction has been added to the ledger. In order to do so, a Registration Authority 4 and a Revocation Authority 5 are connected to the network 2. Before participating in any transaction, any user must first perform an enrollment step during which it gives to the Registration Authority a proof of his real identity. Then, when a transaction is performed, it includes elements which may be used, if needed at any later time, by the Revocation Authority to retrieve the real identity of any of the users involved in the transaction. As described in the following paragraphs, the method according to the invention also includes security features preventing a fraudulent user to participate in a transaction without providing the necessary information enabling the Revocation Authority to retrieve his identity or preventing a fraudulent user to provide forged information that would lead the Revocation Authority to retrieve the identity of another user.

The following paragraphs describe in more details the steps of the method according to the invention.

Figure 3:
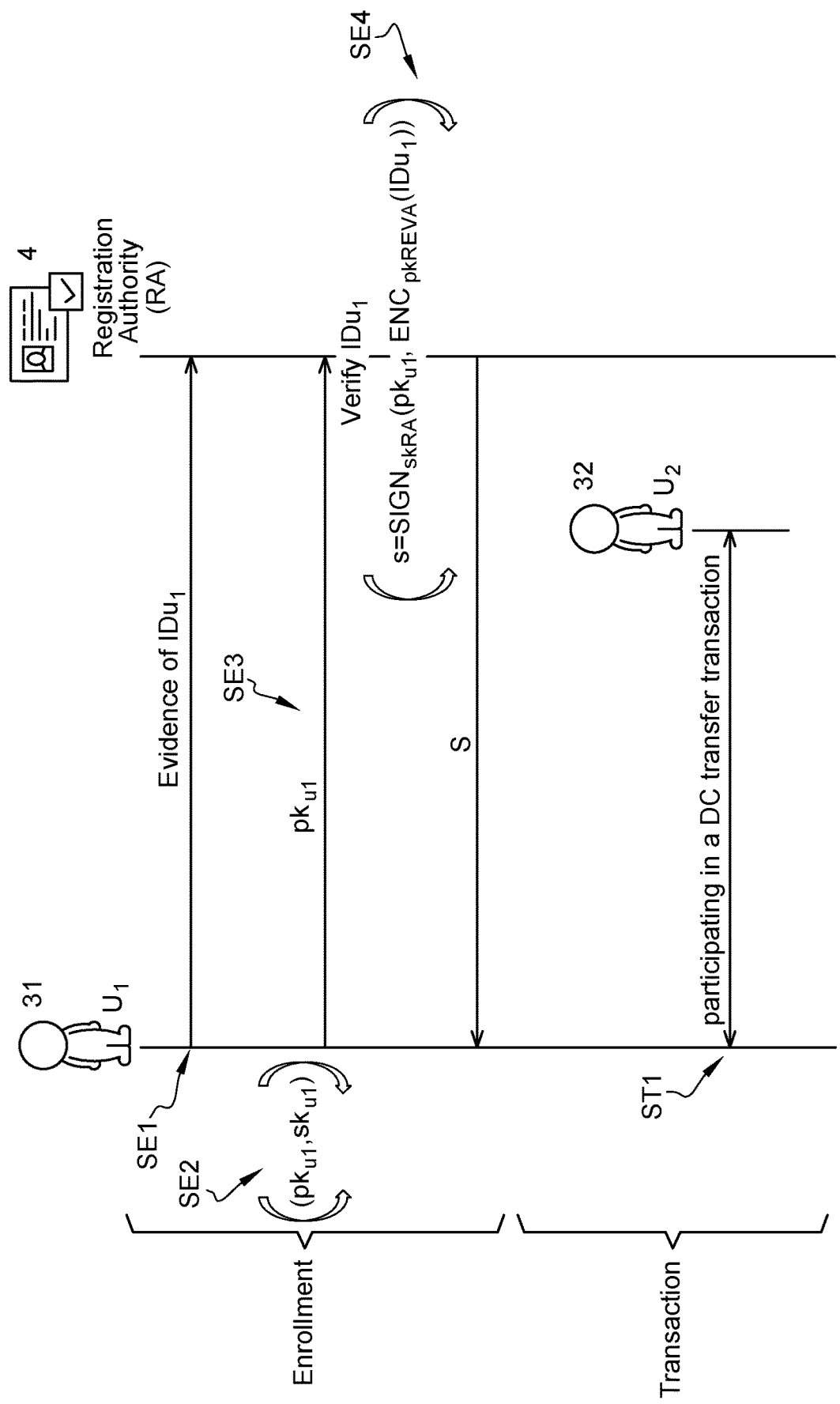
FIG. 3 illustrates schematically a method comprises an enrollment phase and a transaction phase according to an embodiment of the present invention.

As illustrated on FIG. 3, the method according to the invention first comprises an enrollment phase including the following steps. The next paragraphs describe these steps when they are performed by a first user using his user device, called here after first user device. Such steps must be performed by any user in order to become able to participate in DC transfer transactions according to the invention, either as payer or payee.

During a first enrollment step SE1, the first user device 31 sends to the registration authority 4 some evidence of the first user's identity $IDu_1$. Such evidence may for example be a copy of an identity document such as an ID card or a passport, a birth certificate, a driver license or a healthcare service document. Such evidence is verified by the registration authority in order to authenticate the user providing it. Multiple documents may be required, including a user photography.

During a second enrollment step SE2, which can be performed in parallel with the first enrollment step, the first user device generates a first user identification key pair $(pk_{u1}, sk_{u1})$ comprising a first user identification public key $pk_{u1}$ and a first user identification secret key $sk_{u1}$. And during a third enrollment step SE3, the first user device sends the generated first user identification public key $pk_{u1}$ to the registration authority. This public key is meant to be used in all the transactions added to the distributed ledger and involving the first user, in order to provide a mechanism to retrieve his identity, as described here after.

During a fourth enrollment step SE4, after it verified the first user's identity based on provided evidence, the registration authority generates for the first user a signed token s by signing with the registration authority secret key skRA a token comprising the first user identification public key and the first user's identity $IDu_1$ encrypted with the revocation authority public key pkREVA. Such a user's identity $IDu_1$ may for example be an already existing number tied to the user such as a passport number or a healthcare identification number.

Alternatively it may be a random number generated by the registration authority.

$s = SIGN_{skRA}(pk_{u1}, ENC_{pkREVA}(IDu_1))$ with $pk_{u1}$ the first user identification public key. Other data related to the enrollment process may be also included in the data signed to obtain the signed token.

Such a token links the first user identification public key $pk_{u1}$ with his real ID $IDu_1$ without disclosing this ID itself since only the revocation authority is able to decrypt it using its private key $sk_{REVA}$. As shown below, it enables the revocation authority to revoke the first user's anonymity by retrieving the first user's identity.

During this fourth enrollment step SE4, the first user device finally receives his signed token from the registration authority.

As illustrated on FIG. 3, the method according to the invention also comprises a transaction phase during which the first user participates with second users in a DC transfer transaction to be added to the distributed ledger. In this paragraph and the following ones, it is described when it is performed by the first user using his first user device. It must be performed similarly by any user in order to participate in a DC transfer transaction according to the invention, either as second user (payer) or first user (payee).

The following paragraphs describe a first embodiment of the invention, in which user' identification public keys are used as pseudonyms of the users in the transactions added to the distributed ledger. In this embodiment, a Certification Authority CA 6 is also connected to the network in order to deliver enrolled users a certificate for their identification public key. The steps of this embodiment are shown on FIG. 4.

In this embodiment, the method according to the invention comprises a fifth enrollment step SE5 during which the first user sends to the Certification Authority CA his signed token and receives from the certification authority a certificate on his first user identification public key. This certificate also comprises the first user's identity $IDu_1$ encrypted with the revocation authority public key: $ENCpk_{REVA}(IDu_1)$.

Since the provided token has been signed by the registration authority, the certification authority can easily verify that it has not been forged.

Such a certificate is made publically available. It may for example be distributed on request by the Certification Authority. As a result, anyone having the knowledge of the first user public key may find in this certificate the real identity of the first user under an encrypted format that can be decrypted only by the revocation authority.

The next paragraphs describe in this first embodiment how a transaction takes place between two users and how their anonymity may be revoked. In this description, the first user is supposed to be the payee and another user, called second user, is supposed to be the payer. The second user is supposed to be the owner of an amount of Digital Currency sufficient for the transaction to be performed with the first user. The second user may have obtained such Digital Currency by a previous transaction with another user owning Digital Currency or by a previous transaction with a Digital Currency issuer in exchange for central bank money, commercial bank money, electronic money or another alternative digital currency. Such an issuer may for example be a bank or a digital currency marketplace. Such a previous transaction should have been recorded in the ledger in the same way as the transaction with the first user will be recorded as described hereunder.

The transaction phase may comprise a first transaction step ST1 during which the first user sends to the second user his first user identification public key.

The DC transfer transaction usually includes information such as the amount of the transfer, and a reference to a previous transaction by which the payer got the currency. The transaction is signed by the second user using a secret key. In this embodiment, users use their identification private key for signing their transactions.

In this embodiment, the first user identification public key is also included in the DC transfer transaction by the second user before the transaction is submitted to a ledger node, for addition to the ledger. By doing so the identity of the first user, in the form of his identification public key used as a pseudonym, is embedded in the transaction.

The method according to this embodiment also includes a revocation step RS1 during which the Revocation Authority REVA gets the certificate associated to the first user identification public key, and then retrieves the first user's identity $IDu_1$. The certificate may be sent to the REVA by the second user himself or by any other entity, such as a control or law enforcement authority, entitled to ask the revocation authority to reveal a user real identity. The certificate of the first user may be provided to the second user by the first user before the transaction takes place, for example when he transmits his identification public key, or the second user may retrieve it from the certification authority. Alternatively, the certificate may be stored on the ledger, for example in association to a DC transfer transaction, and the Revocation Authority may retrieve it by itself from the ledger. In order to retrieve the first user identity from the first user certificate, the revocation authority only has to decrypt the encrypted value $ENCpk_{REVA}(IDu_1)$ with its private key.

The following paragraphs describe, in the case of the first embodiment, and in the case of the transaction between the first and the second user, how the anonymity of the payer, here the second user, may be revoked.

At the time the transaction between the first user and the second user takes place, the second user is the owner of some digital currency. Therefore he has performed the steps of the enrollment phase described above to receive a second user signed token. He also has sent to the Certification Authority his second user signed token to receive a certificate on his second user identification public key. In order to become owner of digital currency, he has participated in a previous transaction stored in the distributed ledger by which he is considered as the current owner of some amount of Digital Currency. Since in this previous transaction the second user is the payee, this previous transaction comprises the second user identification public key, has described above. Such a previous transaction may be a transaction with a DC issuer by which the second user has withdrawn DC from the issuer, or as a payee in a transaction with another enrolled user already owner of some DC.

In addition, the DC transfer transaction between the first user and the second user comprises a reference to this previous transaction.

Therefore, to revoke the second user's anonymity, the second user identification public key is retrieved from this previous transaction, and the Revocation Authority (REVA) gets the certificate associated to the second user identification public key, and then retrieves the second user's identity ($IDu_2$).

The certificate may be sent to the REVA by the first user himself or by any other entity, such as a control or law enforcement authority, entitled to ask the revocation authority to reveal a user real identity. The certificate of the second user may also be retrieved by the first user from the Certification Authority. Alternatively, the certificate may be stored on the ledger, for example in association to a DC transfer transaction, and the Revocation Authority may retrieve it by itself from the ledger. In order to retrieve the second user identity from the second user certificate, the Revocation Authority only has to decrypt the encrypted value $ENCpk_{REVA}(IDu_1)$ with its private key.

The following paragraphs describe a second embodiment of the invention, in which users are not required anymore to get a certificate for their identification public keys from a Certification Authority. Instead the Revocation Authority has a list of enrolled users, identified by their public key, and stores their real identity. In this embodiment, a user may prove, despite a lack of certificate on his identification public key, that he is an enrolled user and that a public key is his own identification public key by providing a Zero-Knowledge Proof of Knowledge (ZKPK) that the public key is among the list of the Revocation Authority and that he knows the corresponding secret key.

Figure 5:
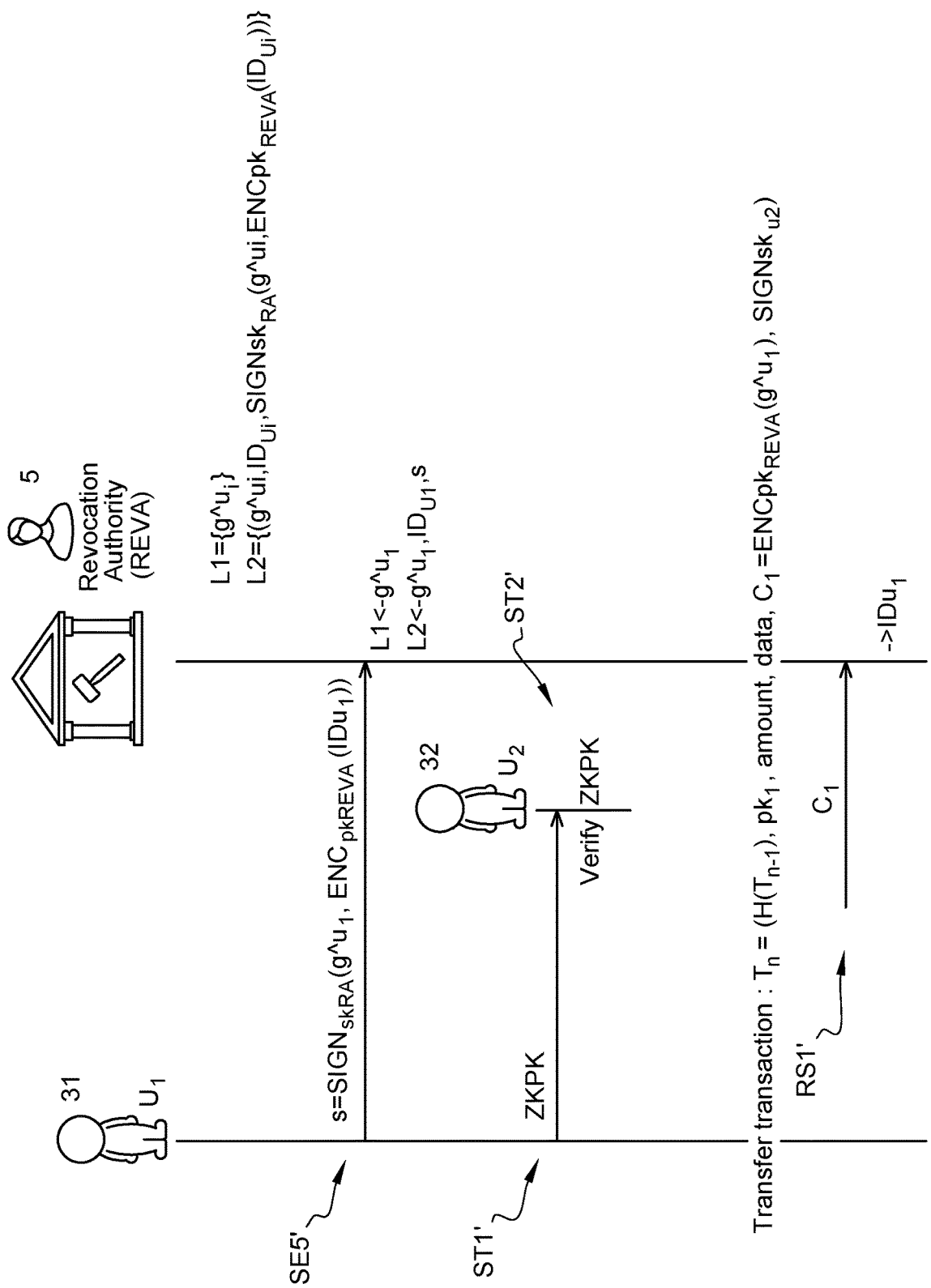
FIG. 5 illustrates schematically a method according to a second embodiment of the present invention.

The steps of this embodiment are shown on FIG. 5

More precisely, in this embodiment, the first user identification key pair may be equal to $(u_1, g^{u_1})$, with $u_1$ the first user identification secret key and g a generator of a cyclic group G of order q, q being an integer. Similarly the identification key pair of a user i may be equal to $(u_i, g^{u_i})$, with $u_i$ the user identification secret key.

The Revocation Authority may have access to at least one, optionally several, list of authorized users L1 comprising identification public keys of users $L1=g^{u_1}, \ldots, g^{u_n}$. The list may be set up and maintained by the Revocation Authority. Alternatively, it may be provided to the revocation authority by another entity. The list of authorized users L1 may be accessible to the Revocation Authority and to enrolled users in order to enable them to verify that a user identified by his identification public key is among the list.

The Revocation Authority may also have access to a users identification list L2 comprising for each user its signed token $ENCpk_{REVA}(ID_{Ui})$, its identification public key $g^{ui}$ and the user's identity $ID_{Ui}$ $L2=\{(g^{ui}, IDUi, SIGNskRA(g^{ui}, ENCpk_{REVA}(ID_{Ui})))\}$. This list is private and only accessible by the Revocation Authority.

In this embodiment, each DC transfer transaction shall comprise the public key of the payee, encrypted with the revocation authority public key ($pk_{REVA}$). This value may be computed by the payee and transmitted to the payer. This value may be later used by the revocation authority to retrieve the payee identification public key and then his real identity. In the case of a transaction between the first user and the second user, the DC transfer transaction may comprise a first user ElGamal ciphertext $C_1=(g^{u_1})$ generated by encrypting the first user identification public key with the revocation authority public key $pk_{REVA}$.

In this embodiment, the method according to the invention comprises an alternate fifth enrollment step SE5' during which the first user sends to the Revocation Authority its signed token $s=SIGN_{skRA}(g^{u_1}, ENC_{pkREVA}(ID_{u1}))$; and the Revocation Authority records the first user identification public key $g^{u_1}$ in the authorized user list $L_1$, and it records the first user identification public key $g^{u_1}$ and the first user's identity $ID_{u1}$ in the private users identification list $L_2$. It may also record the signed token s in the private users identification list $L_2$ as a proof that the recorded first user identification public key $g^{u_1}$ and first user's identity $ID_{u1}$ belong to a single user.

The transaction phase may comprise an alternate first transaction step ST1' during which the first user provides the second user with a zero-knowledge proof of knowledge ZKPK which proves that the first user ElGamal ciphertext C1 is the ElGamal ciphertext value of a user identification public key that belongs to the list of authorized users L1 and that the first user knows the corresponding user identification private key ui, without revealing the first user identification public key.

The transaction phase may comprise an alternate second transaction step ST2' during which the second user verifies the zero-knowledge proof of knowledge provided by the first user. Such a verification ensures that the first user is not using the public identification key of another enrolled user. If the verification succeeds, the second user appends the ZKPK in the Digital Currency transfer transaction and signs the transaction using a secret key. In this embodiment, users use a private signature key other than their identification private key for signing their transactions. The transaction is then added to the distributed ledger.

The method according to this second embodiment also includes an alternate revocation step RS1' during which to revoke first user's anonymity, the Revocation Authority gets the first user ElGamal ciphertext C1, decrypts it and retrieves the first user's identity $ID_{U1}$ using its private users identification list $L_2$. The ciphertext may be sent to the REVA by the second user himself or by any other entity, such as a control or law enforcement authority, entitled to ask the revocation authority to reveal a user real identity.

The following paragraphs describe, in the case of the second embodiment, and in the case of the transaction between the first and the second user, how the anonymity of the payer, here the second user, may also be revoked.

As in the first embodiment, at the time the transaction between the first user and the second user takes place, the second user is the owner of some digital currency. Therefore he has performed the steps of the enrollment phase described above to receive a second user signed token. He also has sent to the revocation Authority his second user signed token to be added to the authorized user list L1 and the private users identification list L2. In order to become owner of digital currency, he has participated in a previous transaction stored in the distributed ledger by which he is considered as the current owner of some amount of Digital Currency. Such a previous transaction may be a transaction with a DC issuer by which the second user has withdrawn DC from the issuer, or a transaction with another enrolled user already owner of some DC. Since in this previous transaction the second user is the payee, this previous transaction comprises a second user ElGamal ciphertext $C2=ENCpk_{REVA}(g^{u_2})$ generated by encrypting the second user identification public key $g^{u_2}$ with the revocation authority public key $pk_{REVA}$ and a zero-knowledge proof of knowledge which proves that the second user ElGamal ciphertext C2 is the ElGamal ciphertext value of a user identification public key that belongs to the list of authorized users L1 and that the second user knows the corresponding user identification private key u2, without revealing the second user identification public key, has described above.

In addition, the DC transfer transaction between the first user and the second user comprises a reference to this previous transaction.

Therefore, to revoke the second user's anonymity, the second user ElGamal ciphertext $C2=ENCpk_{REVA}(g^{u_2})$ generated by encrypting the second user identification public key with said revocation authority public key $pk_{REVA}$ is retrieved from said previous transaction, and is obtained by the Revocation Authority, which decrypts it and retrieves the second user's identity $ID_{U2}$ from the private users identification list $L_2$.

The second user ElGamal ciphertext $C2=(g^{u_2})$ may be sent to the REVA by the first user himself or by any other entity, such as a control or law enforcement authority, entitled to ask the revocation authority to reveal a user real identity. The second user ElGamal ciphertext C2 may be retrieved by the first user from the ledger.

After the revocation authority retrieved the real identity of a user, the Revocation Authority may provide the requesting entity with a zero-knowledge proof of knowledge π to prove that it has correctly decrypted the ciphertext of said user's identity $ID_{Ui}$ encrypted with said revocation authority public key $ENC[pk_{REVA}](ID_{Ui})$ comprised in the certificate and/or the El Gamal ciphertext it received; and therefore that it correctly retrieved the requested identity. This proof authenticates the Revocation Authority.

In order to increase the security, users may be required to renew regularly their keys, their token, and subsequently the certificate of their identification public key in the case of the first embodiment. In order to do so, the first user may perform again the steps of the enrollment phase after he participated in a predetermined number of DC transfer transactions. All enrolled users may have to do the same.

According to a second aspect, the invention is also related to a computer program product directly loadable into the memory of at least one computer, comprising software code instructions for performing the steps of the method described here before when said product is run on the computer.

According to a third aspect, the invention is also related to a system 100 of secure, traceable and privacy-preserving digital currency transfer with anonymity revocation between at least a first and a second user among a plurality of banked and unbanked users by using a distributed ledger comprising a plurality of ledger nodes, described here before and comprising: a Registration Authority, a Revocation Authority, and user devices configured to be connected to said nodes, to said Registration Authority, to said Revocation Authority, comprising each one a processor and an interface configured to perform the steps of the methods described here before.

Figure 4:
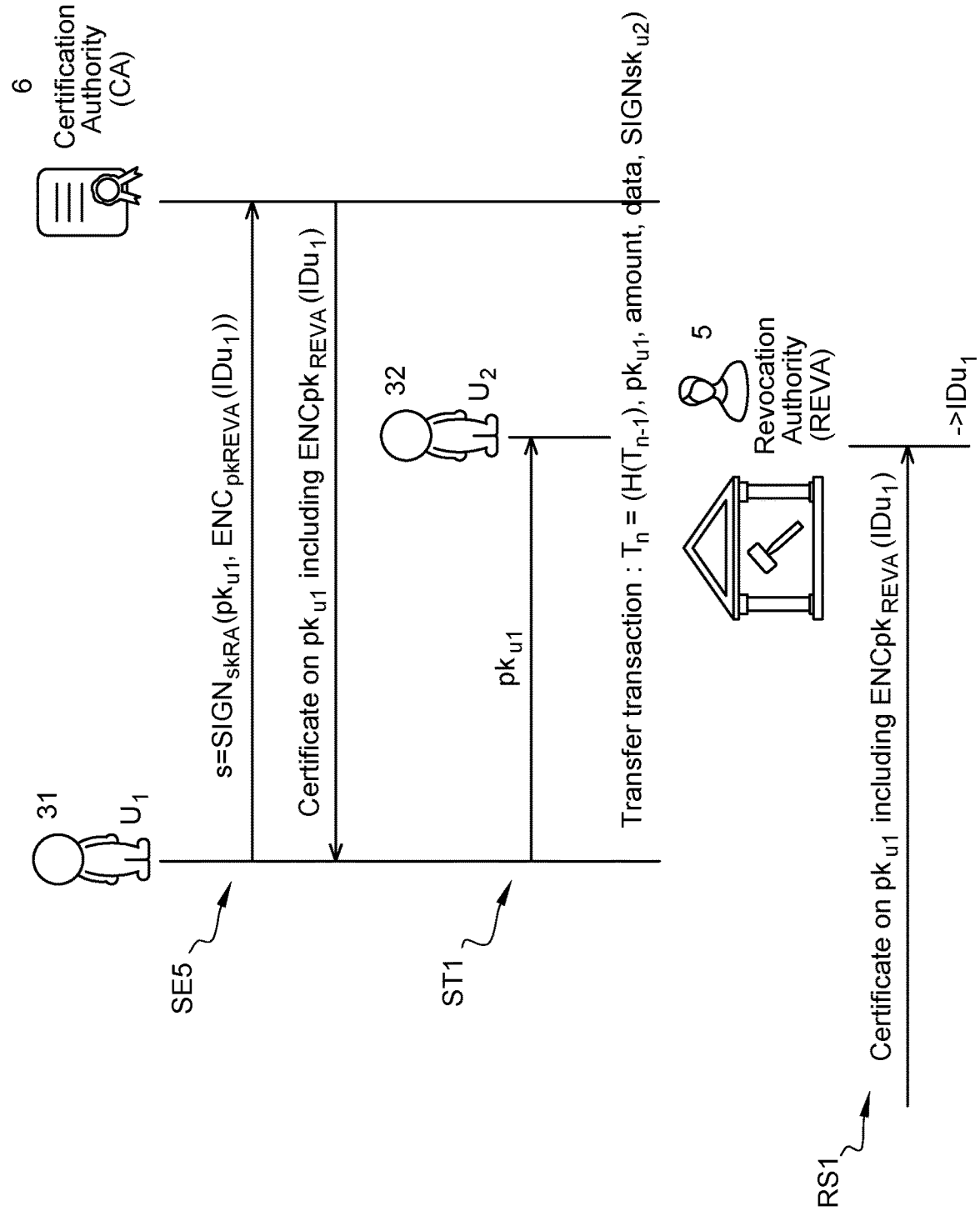
FIG. 4 illustrates schematically a method according to a first embodiment of the present invention.

According to a fourth aspect, the invention is also related to a system 100 of secure, traceable and privacy-preserving digital currency transfer with anonymity revocation between at least a first and a second user among a plurality of banked and unbanked users by using a distributed ledger comprising a plurality of ledger nodes, comprising: a registration authority, a revocation authority, a certification authority and user devices configured to be connected to said nodes, to said registration authority, to said revocation authority and to said certification authority, comprising each one a processor and an interface configured to perform the steps of the method according to the first embodiment described here before and illustrated on FIG. 4.

In addition to these features, such computer program, and systems may be configured for performing or may comprise any other features described here before.

As a result, such methods, devices and system allow users, both bank and unbanked, to perform DC transactions with a high level of anonymity while enabling to revoke the anonymity of users participating in a transaction.

The invention claimed is:

1. A method for secure, traceable and privacy-preserving with anonymity revocation digital currency transfer to at least a first user from a second user among a plurality of banked and unbanked users by using a distributed ledger comprising a plurality of ledger nodes, wherein said users perform Digital Currency transfers by adding transactions on this ledger using user devices configured to be connected to said nodes, to a registration authority and to a revocation authority, said authorities owning each one a public/private key pair, comprising:

an enrollment phase, comprising:
sending, by a user device of said first user, to the registration authority evidence of the first user's identity,
generating, by the user device of said first user, a first user identification key pair comprising a first user identification public key and a first user identification secret key,
sending, by the user device of said first user, to the registration authority said generated first user identification public key,
generating, by the registration authority after the registration authority verified first user's identity based on said evidence, a signed token by signing with the registration authority secret key a token comprising said first user identification public key and said first user's identity encrypted with said revocation authority public key,
receiving, by the user device of said first user, from the registration authority said signed token,
sending, by the user device of said first user, to a Certification Authority said signed token,
generating, by said certification authority, a certificate on said first user identification public key comprising said first user's identity encrypted with said revocation authority public key
and receiving, by the user device of said first user, from said certification authority said generated certificate on said first user identification public key comprising said first user's identity encrypted with said revocation authority public key;

a transaction phase, performed by said user device of said first user, comprising:
participating with said second user in a Digital Currency transfer transaction to be added to the distributed ledger, comprising sending to the second user the first user identification public key which is then included in said Digital Currency transfer transaction;
wherein said signed token enables the revocation authority to revoke first user's anonymity by getting the certificate associated to the first user identification public key and retrieving first user's identity by decrypting said encrypted first user's identity with said revocation authority private key.

2. The method of any one of claim 1, wherein:
the second user having performed the steps of the enrollment phase of claim 1 to receive a second user signed token, having sent to a Certification Authority said second user signed token to receive a certificate on a second user identification public key and having participated in a previous transaction stored in the distributed ledger by which the second user is considered as the current owner of an amount of Digital Currency, said previous transaction comprising the second user identification public key, and
the Digital Currency transfer transaction between said first user and second user comprising a reference to said previous transaction,
to revoke second user's anonymity, the second user identification public key is retrieved from said previous transaction, and the Revocation Authority gets the certificate associated to the second user identification public key and retrieves the second user's identity.

3. The method of claim 1, wherein the Revocation Authority provides a zero-knowledge proof of knowledge to prove that it correctly retrieved the first user's identity.

4. The method of claim 1, wherein the Revocation Authority provides a zero-knowledge proof of knowledge which proves that the Revocation Authority has correctly decrypted the ciphertext of said first user's identity encrypted with said revocation authority public key comprised in the certificate.

5. The method of claim 1, wherein the steps of the enrollment phase of claim 1 are performed again after the first user participated in a predetermined number of Digital Currency transfer transactions.

6. A system of secure, traceable and privacy-preserving digital currency transfer with anonymity revocation between at least a first and a second user among a plurality of banked and unbanked users by using a distributed ledger comprising a plurality of ledger nodes, comprising: a registration authority, a revocation authority, a certification authority and user devices configured to be connected to said nodes, to said registration authority, to said revocation authority and to said certification authority, comprising each one a processor and an interface configured to perform the steps of claim 1.

\* \* \* \* \*